H. VARWIG.
FAUCET.
No. 173,695. Patented Feb. 15, 1876.
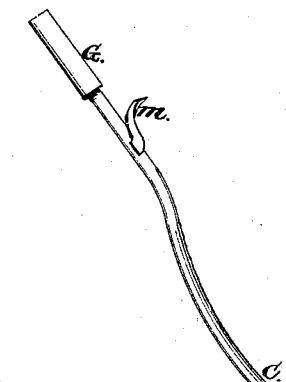
Fig. 1.
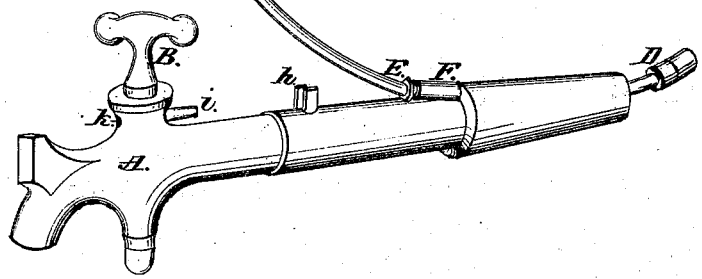
Fig. 2.
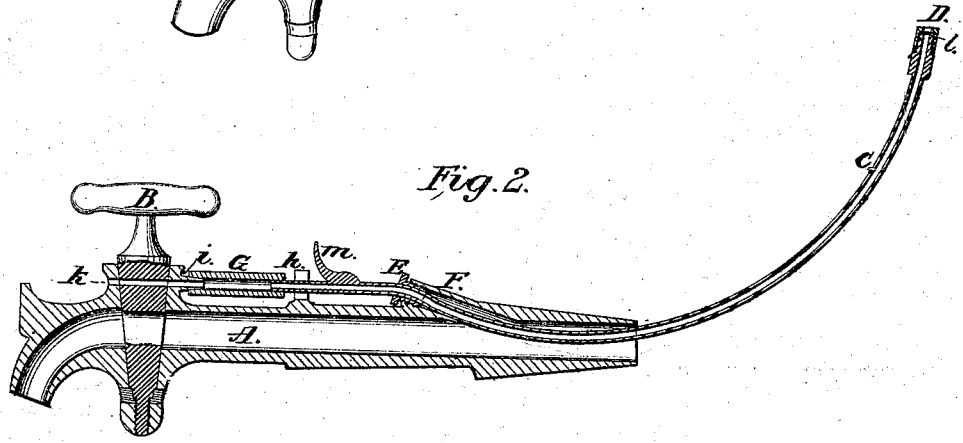
Attest:
James Moore
M. M. Chin
Inventor:
Henry Varwig

UNITED STATES PATENT OFFICE.

HENRY VARWIG, OF CINCINNATI, OHIO.

IMPROVEMENT IN FAUCETS.

Specification forming part of Letters Patent No. 173,695, dated February 15, 1876; application filed September 26, 1874.

*To all whom it may concern:*

Be it known that I, HENRY VARWIG, of Cincinnati, Hamilton county, State of Ohio, have invented a certain new and useful Improvement in Faucets, of which the following is a specification:

My invention relates to that class of faucets having a curved sliding air-duct passing through the barrel of the faucet for the purpose of admitting air to the vessel when the plug of the faucet is open, and be closed to prevent the escape of the gases when the plug is closed. Its object is the production of a cheap and simple faucet, that is not liable to get out of order. This is accomplished by boring a hole through the hub and plug of the faucet when the plug is open, attaching a nipple to the hub at this opening, and providing a connection between this nipple and the sliding air-duct when the faucet is in the cask that can be disconnected, when it is desired to retract the air-duct for the purpose of withdrawing the faucet from or inserting it in the cask, and is an improvement upon the invention for which Letters Patent No. 104,602, dated June 21, 1870, were granted to John Knock, assignor to himself and Henry Varwig.

Figure 1 is a perspective view of my improved faucet, the air-duct being shown in its retracted position and the plug of the faucet closed. Fig. 2 is an axial section of the same, with the air-duct in its protruded position, with the proper connection made, and the plug of the faucet open.

A is the barrel of the faucet, with its customary plug B. Projecting upward from the rear portion of the barrel A is a short cylinder, F, provided with a stuffing-box, E, which receives the curved and sliding air-duct C. This air-duct is provided at its outer end with an adjustable connection piece or joint, G, sleeved over it for connecting it with the barrel by sliding it over the nipple *i*, and at the inner end the opening, which is covered with a piece of india-rubber, *l*, which is secured over the opening, so as to act as a valve to prevent the liquid from escaping into the tube when the vent or passage *k* is closed, and yet allow the air to enter the vessel when the vent is open. This valve *l* is protected by a cap, D, which is pierced at the top to allow the air to pass into the vessel when the vent *k* is opened. *k* is a passage or vent bored through the upper hub of the faucet A, plug B, and nipple *i*, for the admission of air into the vessel through it and the air-duct C when the faucet is open.

Operation: The faucet is inserted in the barrel in the following manner: The air-duct is retracted until the inner end is entirely within the barrel of the faucet. The faucet is then inserted by forcing the cork in in the usual way, after which the air-duct is pushed to its place and the sliding connection-piece slipped over the nipple. When the handle is turned to open the plug of the faucet, the vent through the upper hub and plug of the faucet is also opened, as seen in Fig. 2, and the air passes into the vessel through the air-duct. When the desired amount of liquor has been drawn, and the handle is turned to close the plug, the air is, by the same operation, cut off from entering the vessel, and the gas prevented from escaping.

I prefer to make the connecting-piece G of rubber or other elastic tubing; but it is obvious the air-duct and nipple may be connected by any of the well-known modes of coupling.

I claim—

In combination with the faucet A, having sliding air-duct C, stuffing-box E, vent *k*, and nipple *i*, the coupling-piece G, when used substantially in the manner and for the purpose described.

HENRY VARWIG.

Witnesses:
 JAMES MOORE,
 M. W. OLIVER.